UNITED STATES PATENT OFFICE.

ARTHUR ZART, OF VOHWINKEL, AND HUGO SCHWEITZER, OF ELBERFELD, GERMANY, ASSIGNORS TO FARBENFABRIKEN VORM. FRIEDR. BAYER & CO., OF ELBERFELD, GERMANY, A CORPORATION OF GERMANY.

YELLOW DISAZO DYE.

1,001,183.     Specification of Letters Patent.     Patented Aug. 22, 1911.

No Drawing.     Application filed April 25, 1911. Serial No. 623,176.

*To all whom it may concern:*

Be it known that we, ARTHUR ZART and HUGO SCHWEITZER, doctors of philosophy, chemists, citizens of the German Empire, residing, respectively, at Vohwinkel and Elberfeld, Germany, have invented new and useful Improvements in New Yellow Disazo Dye, of which the following is a specification.

The present invention relates to the manufacture and production of new azo dyestuffs capable of dyeing unmordanted cotton in from yellow to orange shades which on being developed on the fiber become fast to washing.

The process for their production consists in converting into urea compounds carboxylic acids of nitroaminoazo compounds in which the nitro- and amino groups are contained in different nuclei or of the corresponding diaminoazo compounds in which one hydrogen of one amino group is replaced by an acid radical and in subsequently reducing the products obtained from the nitroaminoazo compounds or in saponifying the products obtained from diaminoazo compounds containing an acid radical. The urea compounds are produced in the usual way by treatment with phosgene. The new dyes are after being dried and pulverized in the shape of their alkaline salts dark yellow powders soluble in water with a yellow color and soluble in concentrated sulfuric acid with a reddish to violet color. Upon reduction with stannous chlorid and hydrochloric acid a diamin carboxylic acid and an urea of a diamin is obtained, which is split up into carbonic acid and a diamin.

In order to illustrate the new process more fully the following example is given, the parts being by weight:—The dye obtained from 180 parts of diazotized monoformyl-3.5-diaminobenzoic acid and 137 parts of cresidin

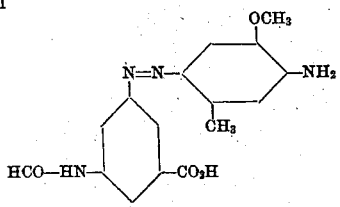

is after solution in aqueous sodium carbonate converted into the urea compound by treatment with phosgene, then salted out, filtered off and boiled for 20 minutes with a 1 per cent. caustic soda lye to eliminate the formic acid radical. It is then salted out and filtered off. It is after being dried and pulverized in the shape of its sodium salt a dark yellow powder soluble in water with a yellow color and soluble in concentrated sulfuric acid with a red color; yielding upon reduction with stannous chlorid and hydrochloric acid symmetrical diaminobenzoic acid and the urea of aminocresidin

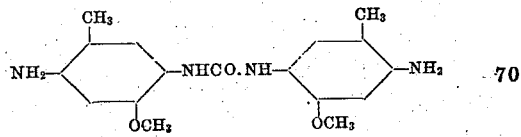

which is further decomposed into paramethoxy-ortho-meta-diaminotoluene and carbonic acid. It dyes cotton yellow yielding a pure yellow of good fastness to washing after combination with diazotized paranitranilin. The shade thus produced can be well discharged.

Instead of formyl-diaminobenzoic acid 3-nitro-5-aminobenzoic acid, 4-oxalylamino-2-aminobenzoic acid, etc., can be used.

As second component any other suitable amin can be used *e. g.* anilin, toluidins, xylidins, acidyldiamins, naphthylamins, etc.

We claim:—

1. The herein described new dyestuffs being ureas of carboxylic acids of aminoazo compounds containing free amino groups, which dyes are after being dried and pulverized in the shape of their alkaline salts dark yellow powders soluble in water with a yellow and soluble in concentrated sulfuric acid with a reddish to violet color; yielding upon reduction with stannous chlorid and hydrochloric acid a diamino carboxylic acid and an urea of a diamin, which is further decomposed into carbonic acid and a diamin; dyeing cotton yellow to orange shades which on being developed on the fiber become fast to washing, substantially as described.

2. The herein described new dyestuff being the urea of the azo compound from 3.5- diaminobenzoic acid and cresidin of the formula:

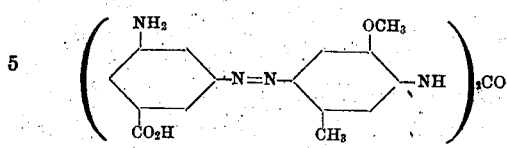

which is after being dried and pulverized in the shape of its sodium salt a dark yellow powder soluble in water with a yellow color and soluble in concentrated sulfuric acid with a red color; yielding upon reduction with stannous chlorid and hydrochloric acid 3.5-phenylenediamin carboxylic acid and the urea of aminocresidin which is further decomposed into para-methoxy-ortho-meta-diaminotoluene and carbonic acid; dyeing cotton yellow shades fast to washing after combination with diazotized para-nitranilin, substantially as described.

In testimony whereof we have hereunto set our hands in the presence of two subscribing witnesses.

ARTHUR ZART. [L. S.]
HUGO SCHWEITZER. [L. S.]

Witnesses:
CHAS. J. WRIGHT,
ALFRED HENKEL.